United States Patent
Kang et al.

(10) Patent No.: US 11,693,419 B2
(45) Date of Patent: Jul. 4, 2023

(54) ISG CONTROL SYSTEM FOR CONSTRUCTION MACHINE AND ISG CONTROL METHOD FOR CONSTRUCTION MACHINE

(71) Applicant: DOOSAN CORPORATION, Seoul (KR)

(72) Inventors: Hyunkyu Kang, Gyeonggi-do (KR); Jinsan Song, Seoul (KR); Semin Park, Incheon (KR)

(73) Assignee: DOOSAN INDUSTRIAL VEHICLE CO., LTD., Incheon (KR)

( * ) Notice: Subject to any disclaimer, the term of this patent is extended or adjusted under 35 U.S.C. 154(b) by 101 days.

(21) Appl. No.: 17/218,585

(22) Filed: Mar. 31, 2021

(65) Prior Publication Data

US 2021/0405645 A1   Dec. 30, 2021

(30) Foreign Application Priority Data

Jun. 25, 2020   (KR) .................. 10-2020-0078015

(51) Int. Cl.
  *G05D 1/02*   (2020.01)
  *G06V 20/56*   (2022.01)
  *G01C 21/34*   (2006.01)

(52) U.S. Cl.
  CPC ....... *G05D 1/0223* (2013.01); *G01C 21/3469* (2013.01); *G05D 1/0219* (2013.01); *G06V 20/56* (2022.01); *G05D 2201/0202* (2013.01)

(58) Field of Classification Search
  CPC .............. G05D 1/0223; G05D 1/0219; G05D 2201/0202; G06V 20/56; G01C 21/3469
  See application file for complete search history.

(56) References Cited

U.S. PATENT DOCUMENTS

| 7,310,576 B1 | 12/2007 | Letang |
| 2005/0103302 A1* | 5/2005 | You ............... F02N 11/0814 123/179.4 |

(Continued)

FOREIGN PATENT DOCUMENTS

JP   2014009078 A   1/2014

OTHER PUBLICATIONS

Search Report issued in corresponding European Patent Application No. 21181301.9 dated Nov. 19, 2021 consisting of 3 pp.

(Continued)

*Primary Examiner* — Vivek D Koppikar
*Assistant Examiner* — Godfrey Aleksander Maciorowski
(74) *Attorney, Agent, or Firm* — Volpe Koenig (57) ABSTRACT

The present disclosure relates to an ISG control system and an ISG control method for a construction machine capable of controlling ISG even in a working state of a construction machine, the ISG control system including: a surrounding environment determinator configured to determine surrounding environment of the construction machine; and a vehicle controller configured to determine whether the construction machine is in a working state or a traveling state based on a determination result from the surrounding environment determinator, wherein the vehicle controller controls an engine based on a preset work ISG condition when it is determined that the construction machine is in the working state, and wherein the vehicle controller controls the engine based on a preset travel ISG condition when it is determined that the construction machine is in the traveling state.

17 Claims, 7 Drawing Sheets

(56) References Cited

U.S. PATENT DOCUMENTS

| | | | |
|---|---|---|---|
| 2009/0163226 A1* | 6/2009 | Karkaria | G06F 1/3203 |
| | | | 455/574 |
| 2010/0292922 A1* | 11/2010 | Tanizaki | G01C 21/3658 |
| | | | 701/431 |
| 2014/0365113 A1* | 12/2014 | McGavran | G01C 21/3626 |
| | | | 701/538 |
| 2015/0159613 A1 | 6/2015 | Jensen | |
| 2015/0274179 A1* | 10/2015 | Inoue | B60T 7/12 |
| | | | 701/70 |
| 2017/0037825 A1* | 2/2017 | Chung | F02N 11/0822 |
| 2017/0267243 A1* | 9/2017 | Chang | B60W 10/11 |
| 2020/0124012 A1* | 4/2020 | Lee | F02N 11/0837 |

OTHER PUBLICATIONS

Office Action issued in corresponding Korean Patent Application No. 10-2020-0078015 dated Oct. 20, 2021, consisting of 4 pp.

\* cited by examiner

| Engine auto-stop entry condition of work ISG condition |
|---|
| 1) Engine maintained at 800 rpm or more for 10 seconds or longer<br>2) Temperature of engine coolant > 60 ℃<br>3) Post-treatment device: Normal<br>4) Battery charge amount > 75 %<br>5) 0 ℃ < Battery temperature < 55 ℃<br>6) 15 ℃ < Temperature inside cab < 27 ℃ |

FIG. 6

| Engine auto-stop condition of work ISG condition |
|---|
| 1) Level ground<br>2) No load<br>3) Air conditioning level 0 to 2<br>4) Heater level 0 to 2<br>5) Displacement of accelerator pedal less than 5 %<br>6) vehicle speed of 0 kph<br>7) Work device lever off<br>8) Inching pedal off |
| 9) Parking brake maintained in on state for 5 seconds or more<br>10) Seat maintained in unseated state for 5 seconds or more<br>11) Gear maintained in neutral state for 5 seconds or more |

FIG. 7

| Engine restart entry condition of work ISG condition |
|---|
| 1) Engine RPM = 0 rpm<br>2) Seat in seated state |

FIG. 8

| Engine forced-restart condition of work ISG condition |
|---|
| 1) Battery charge amount < 75 %<br>2) Brake charge pressure < 100 bar<br>3) Temperature inside cab > 27°C<br>4) Temperature inside cab < 15°C<br>5) Temperature of engine coolant < 60°C<br>6) Battery temperature < 0°C<br>7) Battery temperature > 55°C |

FIG. 9

| Engine auto-restart condition of work ISG condition |
|---|
| 1) Brake on<br>2) Work device lever on<br>3) Inching pedal on |

FIG. 10

| Engine auto-stop entry condition of travel ISG condition |
|---|
| 1) Engine maintained at 800 rpm or more for 10 seconds or longer<br>2) Temperature of engine coolant > 60°C<br>3) Post-treatment device: Normal<br>4) Battery charge amount > 75 %<br>5) 0°C < Battery temperature < 55°C<br>6) 15°C < Temperature inside cab < 27°C |

FIG. 11

| Engine auto-stop condition of travel ISG condition |
| --- |
| 1) Level ground<br>2) Air conditioning level 0 to 2<br>3) Heater level 0 to 2<br>4) Gear forward/neutral<br>5) Displacement of accelerator pedal less than 5 %<br>6) Brake on<br>7) vehicle speed of 0 kph |

FIG. 12

| Engine restart entry condition of travel ISG condition |
| --- |
| 1) Engine RPM = 0 rpm<br>2) Seat in seated state |

FIG. 13

| Engine forced-restart condition of travel ISG condition |
| --- |
| 1) Battery charge amount < 75 %<br>2) Brake charge pressure < 100 bar<br>3) Temperature inside cab > 27 ℃<br>4) Temperature inside cab < 15 ℃<br>5) Temperature of engine coolant < 60 ℃<br>6) Battery temperature < 0 ℃<br>7) Battery temperature > 55 ℃ |

FIG. 14

| Engine auto-restart condition of travel ISG condition |
| --- |
| Brake off |

FIG. 15

ISG CONTROL SYSTEM FOR CONSTRUCTION MACHINE AND ISG CONTROL METHOD FOR CONSTRUCTION MACHINE

CROSS-REFERENCE TO RELATED APPLICATION

This application claims priority under 35 U.S.C. § 119 to Korean Patent Application No. 10-2020-0078015, filed on Jun. 25, 2020, in the Korean Intellectual Property Office (KIPO), the disclosure of which is incorporated by reference herein in its entirety.

TECHNICAL FIELD

Embodiments of the present disclosure relate to an ISG (Idle Stop and Go) control system for a construction machine, and more particularly, to an ISG control system for a construction machine capable of controlling ISG even in a working state of the construction machine and to an ISG control method for a construction machine.

BACKGROUND ART

Recently, various efforts are made for vehicles to reduce greenhouse gases, and as part of them, various methods to improve fuel economy are being sought. In order to improve fuel economy, an ISG system is being widely used globally. The ISG system receives information on, for example, vehicle speed, engine revolution speed, and coolant temperature and prevents fuel consumption by stopping an engine when idle.

That is, when, for example, a vehicle stops and waits for a signal, the ISG system automatically stops an idling engine, and after a predetermined time, restarts the engine at the driver's request by controlling, for example, an accelerator and a brake pedal. The ISG system may achieve a fuel economy effect of about 5 to 15% in an actual fuel economy mode.

For example, Korean Patent Laid-Open No. 10-2012-0062559 (published on Jun. 14, 2012) discloses a technology that may substantially prevent unnecessary fuel consumption due to idling by controlling the start-up of the engine according to engine stop conditions and engine restart conditions for automatic transmission vehicles.

Meanwhile, construction machinery, dissimilar to vehicles with general purpose of driving such as passenger cars, performs works (e.g., tasks, operations) as well in addition to driving, but the conventional ISG systems do not consider such works and only provide control over driving or traveling.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present disclosure may be directed to an ISG control system for a construction machine and an ISG control method for a construction machine capable of controlling ISG even in a working state of a construction machine.

According to an embodiment, an ISG (Idle Stop and Go) control system for a construction machine includes: a surrounding environment determinator configured to determine surrounding environment of the construction machine; and a vehicle controller configured to determine whether the construction machine is in a working state or a traveling state based on a determination result from the surrounding environment determinator, wherein the vehicle controller controls an engine based on a preset work ISG condition when it is determined that the construction machine is in the working state, and wherein the vehicle controller controls the engine based on a preset travel ISG condition when it is determined that the construction machine is in the traveling state.

In some embodiment, the vehicle controller determines that the construction machine is in the working state when the surrounding environment determinator determines that a location where the construction machine is located is an indoor space or a preset workplace.

In some embodiment, the vehicle controller determines that the construction machine is in the traveling state when the surrounding environment determinator determines that a lane exists around the construction machine.

In some embodiment, the vehicle controller determines that the construction machine is in the traveling state when the surrounding environment determinator determines that the lane exists around the construction, and when a vehicle speed of the construction machine exceeds a preset reference speed.

In some embodiment, the vehicle controller determines that an engine auto-stop entry condition of the work ISG condition is satisfied under conditions that the construction machine is in the working state, an ISG cut-off switch of the construction machine is in an off state, the engine is maintained at 800 rpm or more for at least 10 seconds, a temperature of an engine coolant of the construction machine is greater than 60 degrees Celsius, a battery charge amount of the construction machine is greater than 75%, a battery temperature of the construction machinery is greater than 0 degrees Celsius and less than 55 degrees Celsius, and a temperature in a cab of the construction machine is greater than 15 degrees Celsius and less than 27 degrees Celsius.

In some embodiment, the vehicle controller determines that an engine auto-stop condition of the work ISG condition is satisfied under conditions that the construction machine is located on a level ground, the construction machine is in a no-load state, an air conditioner of the construction machine operates at a level less than a maximum level, a heater of the construction machine operates at a level less than a maximum level, a displacement of an accelerator pedal of the construction machine is less than 5%, a speed of the construction machine is 0, a work device lever of the construction machine is in an off state, and an inching pedal of the construction machine is in an off state, a parking brake of the construction machine is maintained in an on state for 5 seconds or more, a seat of the construction machine is maintained in an unseated state for 5 seconds or more, or a gear of the construction machine is maintained in a neutral state for 5 seconds or more.

In some embodiment, the vehicle controller determines that an engine restart entry condition of the work ISG condition is satisfied, when a revolution number of the engine is 0 after the engine auto-stop condition of the work ISG condition is satisfied and the engine is stopped, and the seat is maintained in a seated state.

In some embodiment, the vehicle controller determines that an engine forced-restart condition of the work ISG condition is satisfied under conditions that the battery charge amount is less than 75%, a charge pressure of a brake of the construction machine is less than 100 bar, the temperature in the cab is greater than 27 degrees Celsius, the temperature in the cab is less than 15 degrees Celsius, the temperature of the engine coolant is less than 60 degrees Celsius, the battery temperature is less than 0 degrees Celsius, or the battery temperature is greater than 55 degrees Celsius.

In some embodiment, the vehicle controller determines that an engine auto-restart condition of the work ISG condition is satisfied under conditions that the brake is in an on state, the work device lever of the construction machine is operated, or the inching pedal is in an on state.

In some embodiment, the vehicle controller determines that an engine auto-stop entry condition of the travel ISG condition is satisfied under conditions that that the construction machine is in the traveling state, an ISG cut-off switch of the construction machine is in an off state, the engine is maintained at 800 rpm or more for 10 seconds or longer, a temperature of an engine coolant of the construction machine is greater than 60 degrees Celsius, a battery charge amount of the construction machine is greater than 75%, a battery temperature of the construction machinery is greater than 0 degrees Celsius and less than 55 degrees Celsius, and a temperature in a cab of the construction machine is greater than 15 degrees Celsius and less than 27 degrees Celsius.

In some embodiment, the vehicle controller determines that an engine auto-stop condition of the travel ISG condition is satisfied under conditions that the construction machine is located on a level ground, the construction machine is in a no-load state, an air conditioner of the construction machine operates at a level less than a maximum level, a heater of the construction machine operates at a level less than a maximum level, a gear of the construction machine is positioned in either forward or neutral, a displacement of an accelerator pedal of the construction machine is less than 5%, a brake of the construction machine is in an on state, and a vehicle speed of the construction machine is 0.

In some embodiment, after the engine auto-stop condition is satisfied and the engine is stopped, when a revolution number of the engine is 0, and the seat is maintained in a seated state, the vehicle controller may determine that an engine restart entry condition of the travel ISG condition is satisfied.

In some embodiment, the vehicle controller determines that an engine forced-restart condition of the travel ISG condition is satisfied under conditions that the battery charge amount is less than 75%, a charge pressure of the brake of the construction machine is less than 100 bar, the temperature in the cab is greater than 27 degrees Celsius, the temperature in the cab is less than 15 degrees Celsius, the temperature of the engine coolant is less than 60 degrees Celsius, the battery temperature is less than 0 degrees Celsius, or the battery temperature is greater than 55 degrees Celsius.

In some embodiment, the vehicle controller may determine that an engine auto-restart condition of the travel ISG condition is satisfied when the brake is in an off state.

According to another embodiment, a method of controlling ISG of a construction machine, the method includes: determining surrounding environment of the construction machine; and determining whether the construction machine is in a working state or a traveling state based on a determination result of the surrounding environment, wherein the vehicle controller controls an engine based on a preset work ISG condition when it is determined that the construction machine is in the working state, and wherein the vehicle controller controls the engine based on a preset travel ISG condition when it is determined that the construction machine is in the traveling state.

In some embodiment, the work ISG condition may include an engine stop entry condition, an engine stop condition, an engine restart entry condition, an engine forced-restart condition, and an engine auto-restart condition, and the travel ISG condition may include an engine stop entry condition, an engine stop condition, an engine restart entry condition, an engine forced-restart condition, and an engine auto-restart condition.

In some embodiment, the step of controlling of the engine based on the work ISG condition when it is determined that the construction machine is in the working state may comprise: determining whether the engine stop entry condition of the work ISG condition is satisfied; determining whether the engine stop condition of the work ISG condition is satisfied when the engine stop entry condition of the work ISG condition is satisfied; stopping the engine when the engine stop condition of the work ISG condition is satisfied; determining whether the engine restart entry condition of the work ISG condition is satisfied; determining whether the engine forced-restart condition of the work ISG condition is satisfied when the engine restart entry condition of the work ISG condition is satisfied; determining whether the engine auto-restart condition of the work ISG condition is satisfied when the engine forced-restart condition of the work ISG condition is not satisfied; and restarting the engine when the engine auto-restart condition of the work ISG condition is satisfied.

In some embodiment, the step of controlling of the engine based on the travel ISG condition when it is determined that the construction machine is in the traveling state may comprise: determining whether the engine stop entry condition of the travel ISG condition is satisfied; determining whether the engine stop condition of the travel ISG condition is satisfied when the engine stop entry condition of the travel ISG condition is satisfied; stopping the engine when the engine stop condition of the travel ISG condition is satisfied; determining whether the engine restart entry condition of the travel ISG condition is satisfied; determining whether the engine forced-restart condition of the travel ISG condition is satisfied when the engine restart entry condition of the travel ISG condition is satisfied; determining whether the engine auto-restart condition of the travel ISG condition is satisfied when the engine forced-restart condition of the travel ISG condition is not satisfied; and restarting the engine when the engine auto-restart condition of the travel ISG condition is satisfied.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Embodiments will now be described more fully hereinafter with reference to the accompanying drawings. Although the invention may be modified in various manners and have several embodiments, embodiments are illustrated in the accompanying drawings and will be mainly described in the specification. However, the scope of the present disclosure is not limited to the embodiments and should be construed as including all the changes, equivalents and substitutions included in the spirit and scope of the present disclosure. Some of the parts which are not associated with the description may not be provided in order to specifically describe embodiments of the present invention and like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in a case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Hereinafter, an ISG control system for a construction machine and an ISG control method for a construction machine according to embodiments of the present disclosure will be described in detail with reference to FIGS. 1 to 15.

Figure 1:
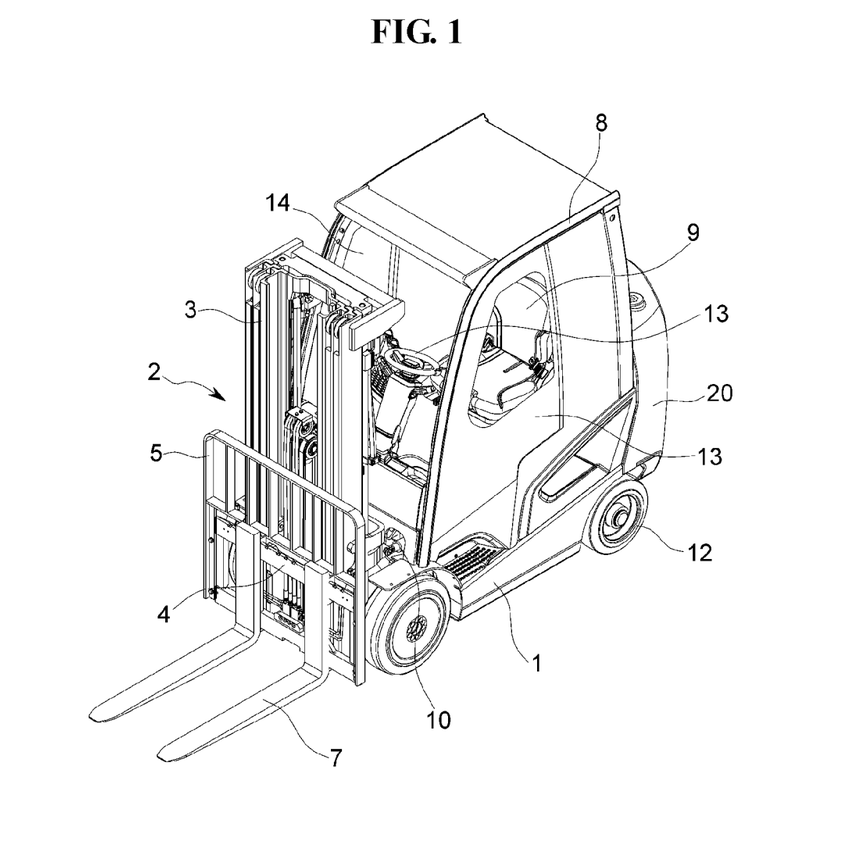
FIG. 1 is a perspective view illustrating a construction machine according to an embodiment of the present disclosure.

FIG. 1 is a perspective view illustrating a construction machine according to an embodiment of the present disclosure.

The construction machine according to an embodiment may be a forklift, as in one example illustrated in FIG. 1.

The construction machine according to an embodiment may include a vehicle body frame 1 including an engine installed therein, and a mast assembly 2 installed in front of the vehicle body frame 1, as illustrated in FIG. 1.

The mast assembly 2 may include a mast rail 3 arranged in a vertical direction, and a carriage 4 that may be raised in an upward direction and lowered in a downward direction along the mast rail 3.

The mast assembly 2 may be maintained in a slightly tilted state toward a driver's seat by a tilt cylinder 10.

The carriage 4 may be raised in an upward direction and lowered in a downward direction by a lift chain 6. A pair of forks 7 for lifting loads may be installed in front of the carriage 4.

The pair of forks 7 are provided so that their width may be adjusted left and right, and a backrest 5 for supporting the load may be installed thereabove.

A cab (or cabin) 8 may be disposed on the vehicle body frame 1. Windows are disposed on respective front and rear sides of the cab 8, and doors 13 and 14 are disposed on left and right sides of the cab 8, respectively. The cab 8 may be defined as a space surrounded by the windows and the doors 13 and 14. In the cab 8, a seat 9 and an operation unit may be disposed. The operation unit may include a steering 13, a work device lever, a gear, an accelerator pedal, a brake pedal (e.g., foot brake pedal), an inching pedal, an ISG cut-off switch 102, a seat adjustment switch, and the like.

A steering axle beam for controlling steering of the forklift may be provided at a rear wheel 12 of the vehicle body frame 1. The axle beam is typically installed below the vehicle body frame 1 and is installed so as to be rotatable at a certain angle around a central axis.

In addition, at the rear of the vehicle body frame 1, a counterweight 20 may be installed in order to achieve a balance with the front at which the load is mounted. The counterweight 20 is typically made of a casting by a casting method, and when a heavy object is lifted or lowered by the carriage, the load of the heavy object is evenly distributed to improve the stability of work.

Figure 2:
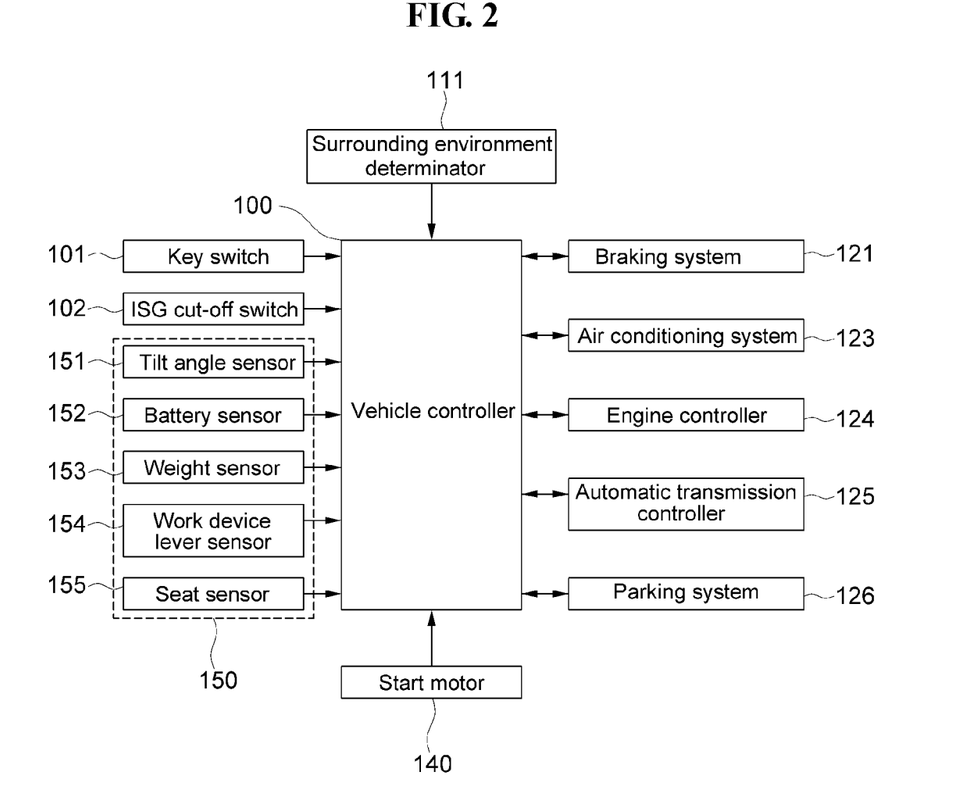
FIG. 2 is a block diagram illustrating an ISG control system for the construction machine of FIG. 1.
Figure 3:
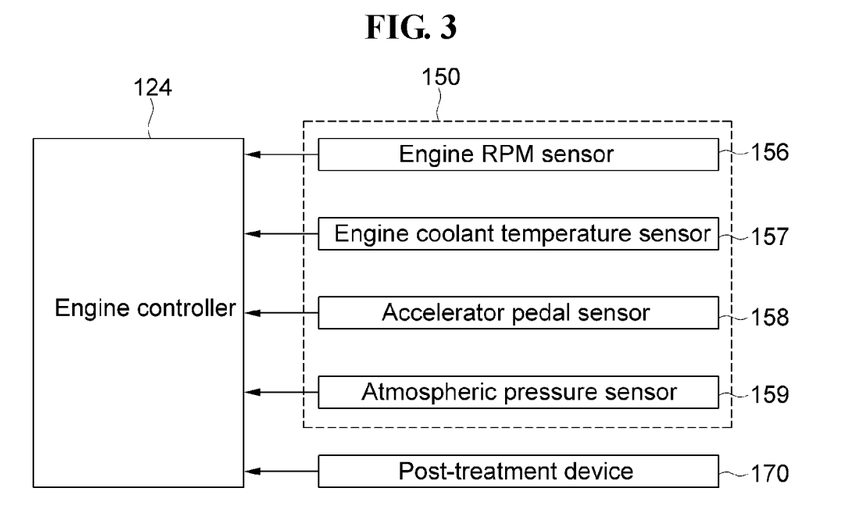
FIG. 3 is a block diagram illustrating an engine controller of FIG. 2 and various peripheral devices connected thereto.
Figure 4:
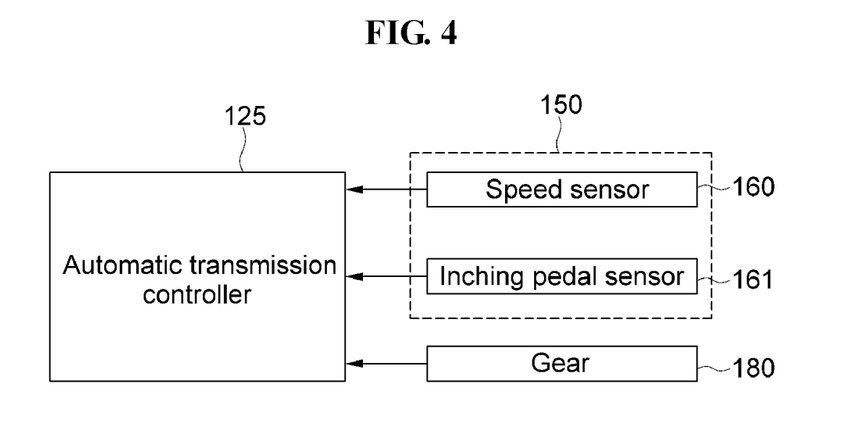
FIG. 4 is a block diagram illustrating an automatic transmission controller of FIG. 2 and various peripheral devices connected thereto.

FIG. 2 is a block diagram illustrating an ISG control system for the construction machine of FIG. 1, FIG. 3 is a block diagram illustrating an engine controller 124 of FIG. 2 and various peripheral devices connected thereto, and FIG. 4 is a block diagram illustrating an automatic transmission controller 125 of FIG. 2 and various peripheral devices connected thereto.

The ISG control system according to an embodiment of the present disclosure may include, as illustrated in FIG. 2, a vehicle controller 100, a key switch (or start switch) 101, an ISG cut-off switch 102, a sensor 150, a braking system 121, an air conditioning system 123, an engine controller 124, an automatic transmission controller 125, a parking system 126, a starter motor 140, and a surrounding environment determinator 111.

The key switch 101 may include a plurality of switching terminals capable of performing startup on/off, engine startup, preheating, and the like of the construction machine, and may have a rotary structure in which a connection state with the plurality of switching terminals changes according to rotation of a startup key. The key switch 101 may be mechanically provided in a mechanical rotation type, and in such an embodiment, it may be provided to be connected to a desired switching terminal by rotating the startup key to rotate an electric contact portion. In addition, the key switch 101 may be provided in a button-type one-touch structure such as a smart startup key, so that an electric contact portion is sequentially rotated each time it is touched to be connected to a desired switching terminal.

The ISG cut-off switch 102 deactivates the ISG system. For example, when the ISG cut-off switch 102 is turned on, the ISG system is deactivated. On the other hand, when the ISG cut-off switch 102 is turned off, the ISG system is activated. When the ISG cut-off switch 102 is in an on state, the ISG cut-off switch 102 transmits an on signal to the vehicle controller 100, and when the ISG cut-off switch 102 is in an off state, the ISG cut-off switch 102 transmits an off signal to the vehicle controller 100. The vehicle controller 100 may determine whether the ISG cut-off switch 102 is in the on state or the off state based on a signal from the ISG cut-off switch 102.

The braking system 121 may include a brake (e.g., foot brake).

The air conditioning system 123 may include an air conditioner and a heater for controlling an internal temperature of the cab 8.

As illustrated in FIG. 3, the engine controller 124 may receive various information from an engine RPM sensor 156, an engine coolant temperature sensor 157, an accelerator pedal sensor 158, an atmospheric pressure sensor 159, and a post-treatment device 170, and transmit the received information to the vehicle controller 100.

The starter motor 140 starts the engine when the key switch 101 is turned on. Information related to the number of times the starter motor 140 is driven may be transmitted to the vehicle controller 100.

As illustrated in FIGS. 2 to 4, the sensor 150 may include a tilt angle sensor 151, a battery sensor 152, a weight sensor 153, a work device lever sensor 154, a seat sensor 155, the engine RPM sensor 156, the engine coolant temperature sensor 157, the accelerator pedal sensor 158, the atmospheric pressure sensor 159, a speed sensor 160, and an inching pedal sensor 161.

The tilt angle sensor 151 detects a tilt of the construction machine and transmits the detected tilt information of the construction machine to the vehicle controller 100. The vehicle controller 100 may determine whether the construction machine is located on a level ground or a slope based on the tilt information.

The battery sensor 152 may detect a charge amount of a battery of the construction machine and a temperature of the battery. The battery sensor 152 transmits the detected battery charge amount and the battery temperature to the vehicle controller 100. The vehicle controller 100 may identify an overall state of the battery through the battery charge amount and battery temperature information.

The weight sensor 153 detects a load of the construction machine and transmits the detected load information to the vehicle controller 100. For example, when the aforementioned construction machine is a forklift, the weight sensor 153 may detect a weight of a load placed on the fork 7 of the forklift. The vehicle controller 100 may determine whether the construction machine is in a load state or a no-load state through the load information.

The work device lever sensor 154 may detect an on state and an off state of a work device lever. In other words, the work device lever sensor 154 detects whether the work device lever is operated and transmits the detected operation information to the vehicle controller 100. For example, when the work device lever is in a non-operation state in which the work device lever does not move in any direction, the work device lever sensor 154 may transmit an off signal to the vehicle controller 100. On the other hand, when the work device lever is operated to move in an arbitrary direction, the work device lever sensor 154 may transmit an on signal including information on a direction of the movement to the vehicle controller 100. When the work device lever is operated to move in an arbitrary direction, the fork 7 is raised or lowered. For example, when the work device lever is pulled, the fork 7 may be raised, and when the work device lever is pushed, the fork 7 may be lowered.

The seat sensor 155 detects a load applied to the seat 9 and transmits the detected load information to the vehicle controller 100. Based on this load information, the vehicle controller 100 determines whether the seat 9 is in a seated state in which the seat 9 is seated by a driver or in an unseated state in which the seat 9 is not occupied by the driver. For example, the vehicle controller 100 compares the detected load with a preset reference load. Then, when the load detected as a result of the comparison is greater than the reference load, the vehicle controller 100 may determine that the driver is seated on the seat 9. On the other hand, when the load detected as a result of the comparison is less than or equal to the reference load, the vehicle controller 100 may determine that the driver is not seated on the seat 9. In other words, it may be determined that the sheet is in the unseated state.

The engine RPM sensor 156 detects the number of revolution (i.e., RPM (Revolution Per Minute)) of the engine and transmits the detected revolution number information to the vehicle controller 100.

The engine coolant temperature sensor 157 detects a temperature of an engine coolant and transmits the detected temperature information of the engine coolant to the vehicle controller 100.

The accelerator pedal sensor 158 detects a displacement amount of the accelerator pedal according to a pressure applied to the accelerator pedal, and transmits the detected displacement amount information to the vehicle controller 100.

The atmospheric pressure sensor 159 detects an atmospheric pressure outside the construction machine and transmits the detected atmospheric pressure information to the vehicle controller 100.

The speed sensor 160 detects a speed (e.g., vehicle speed) of the construction machine, and transmits the detected speed information to the vehicle controller 100.

The inching pedal sensor 161 may detect whether the inching pedal is in an on state or an off state. The inching pedal serves to guide a hydraulic oil from a hydraulic pump to a travel driving mechanism to flow toward the work device to compensate for lack of power in the work device (for example, the carriage 4 of the forklift) not only on slopes but also on level ground. For example, when pressure is applied to the inching pedal and the inching pedal is turned on, an inching spool of an inching valve connected to the inching pedal and links is operated, and a flow path of the hydraulic oil supplied to the travel driving mechanism is blocked and is changed toward the work device, and at substantially the same time, braking function is performed on the vehicle. Accordingly, when pressure is applied to the accelerator pedal while pressure is applied to the inching pedal, an output of the hydraulic pump is intensively supplied to the work device, such that the carriage 4 provided in the mast assembly 4 may be rapidly raised or lowered. When the inching pedal is in the on state, the inching pedal sensor 161 transmits an on signal to the vehicle controller 100, and when the inching pedal is in the off state, the inching pedal sensor 161 transmits an off signal to the vehicle controller 100. The vehicle controller 100 may determine whether the inching pedal is in the on state or the off state based on the signal from the inching pedal sensor 161.

The automatic transmission controller 125 transmits signals from the speed sensor, the inching pedal sensor 161 and the gear 180 to the vehicle controller 100. In such an embodiment, the gear 180 is an FNR (Forward-Neutral-Reverse) gear (or FNR lever) that may be switched to a forward mode, a neutral mode, and a reverse mode, and the forward, neutral and reverse state of the construction machine may be controlled by the gear 180.

The surrounding environment determinator 111 may determine surrounding environment of the construction machine. To this end, the surrounding environment determinator 111 may include a photographing means such as a camera. For example, the surrounding environment determinator 111 photographs surrounding environment of the construction machine using the camera and transmits image information of the photographed surrounding environment to the vehicle controller 100.

The vehicle controller 100 may determine whether the construction machine is in a traveling state or a working state based on the transmitted image information. For example, when the image information includes a lane (e.g., traffic lane) around the construction machine, the vehicle controller 100 may determine that the construction machine is currently in the traveling state (or is traveling). As another example, when it is determined by the surrounding environment determinator 111 that a lane exists around the construction machine and that the vehicle speed of the construction machine exceeds a preset reference speed, the vehicle controller 100 may determine that the construction machine is in the traveling state.

The surrounding environment determinator 111 may determine location of the construction machine using an internal GPS (Global Positioning System) device. The surrounding environment determinator 111 may transmit location coordinate information of the construction machine to the vehicle controller 100. In such an embodiment, the vehicle controller 100 may determine whether the location where the construction machine is located is a location corresponding to an indoor space or a preset workplace based on the location coordinate information. If, as a result of the determination, it is determined that the construction machine is located indoor space or in a place corresponding to the preset workplace, the vehicle controller 100 may determine that the construction machine is in a working state (or is working).

In an embodiment, the determination on the photographed image may be performed by the vehicle controller 100 as described above, but otherwise, the surrounding environment determinator 111 may directly determine it. In this case, the surrounding environment determinator 111 may determine whether the construction machine is in the working state or the traveling state. As a specific example of this, the surrounding environment determinator 111 obtains location coordinates of the construction machine using the internal GPS device. When the obtained location coordinates correspond to the indoor space or the preset workplace location, the surrounding environment determinator 111 determines that the construction machine is in the working state. However, when the obtained position coordinates correspond to an outdoor space or a road other than an indoor space, the surrounding environment determinator 111 photographs the surrounding environment of the construction machine using the camera. Then, when the image information on the photographed surrounding environment includes a lane around the construction machine, the surrounding environment determinator 111 may determine that the construction machine is currently in the traveling state. As another example, when it is determined by the surrounding environment determinator 111 that a lane exists around the construction machine and that the vehicle speed of the construction machine exceeds a preset reference speed, the vehicle controller 100 may determine that the construction machine is in the traveling state. The determination result from the surrounding environment determinator 111 may be transmitted to the vehicle controller 100.

In an embodiment, in the above-described example, the surrounding environment determinator 111 may transmit the location coordinates and photographed image information of the construction machine to the vehicle controller 100 without making a determination. In such a case, the vehicle controller 100 may finally determine whether the construction machine is working or traveling based on the location coordinates and image information. For example, when the location coordinates transmitted from the surrounding environment determinator 111 correspond to an indoor space or coincide with the preset workplace location, the vehicle controller 100 determines that the construction machine is in the working state. However, when the location coordinates transmitted from the surrounding environment determinator 111 correspond to an outdoor space or road other than an indoor space, the vehicle controller 100 analyzes the image information transmitted from the surrounding environment determinator 111. In other words, when the analyzed image information includes a lane around the construction machine, the vehicle controller 100 may determine that the construction machine is currently in the traveling state (or is traveling). As another example, when it is determined that a lane exists around the construction machine and that the vehicle speed of the construction machine exceeds a preset reference speed, the vehicle controller 100 may determine that the construction machine is in the traveling state.

When it is determined that the construction machine is in the traveling state, the vehicle controller 100 may control the engine based on a preset travel ISG (Idle Stop and Go) condition. On the other hand, when it is determined that the construction machine is in the working state, the vehicle controller 100 may control the engine based on a preset work ISG condition.

The work ISG condition may include an engine auto-stop entry condition, an engine auto-stop condition, an engine restart entry condition, an engine forced-restart condition, and an engine auto-restart condition.

Similarly, the travel ISG condition may also include an engine auto-stop entry condition, an engine auto-stop condition, an engine restart entry condition, an engine forced-restart condition, and an engine auto-restart condition.

FIGS. 5 to 9 are tables showing the engine auto-stop entry condition, the engine auto-stop condition, the engine restart entry condition, the engine forced-restart condition, and the engine auto-restart condition included in the work ISG condition.

Figure 5:
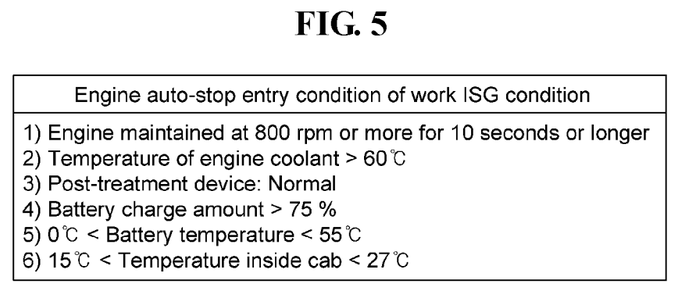
FIGS. 5 to 9 are tables showing an engine auto-stop entry condition, an engine auto-stop condition, an engine restart entry condition, an engine forced-restart condition, and an engine auto-restart condition included in a work ISG condition.

First, under conditions that it is determined that the construction machine is in the working state and that the ISG cut-off switch 102 is in the off state, as illustrated in FIG. 5, the vehicle controller 100 determines that engine auto-stop entry condition of the work ISG condition is satisfied, when the engine is maintained at 800 rpm or more for 10 seconds or longer, the temperature of the engine coolant is greater than 60 degrees Celsius, the post-treatment device 170 is in the off state (that is, an amount of soot to be described below is in a normal state), the battery charge amount is greater than 75%, the battery temperature is greater than 0 degrees Celsius and less than 55 degrees Celsius, and the temperature in the cab 8 is greater than 15 degrees Celsius and less than 27 degrees Celsius. That is, when all of the conditions 1) to 6) of FIG. 5 are satisfied, it is determined that the engine auto-stop entry condition is satisfied.

In such an embodiment, the post-treatment device 170 may include a Diesel Particulate Filter (DPF), and when an amount of soot is less than 100%, it is determined that the amount of soot is normal, and the post-treatment device 170 is not operated. In other words, when the amount of soot is less than 100%, the DPF is maintained in an off state.

Figure 6:
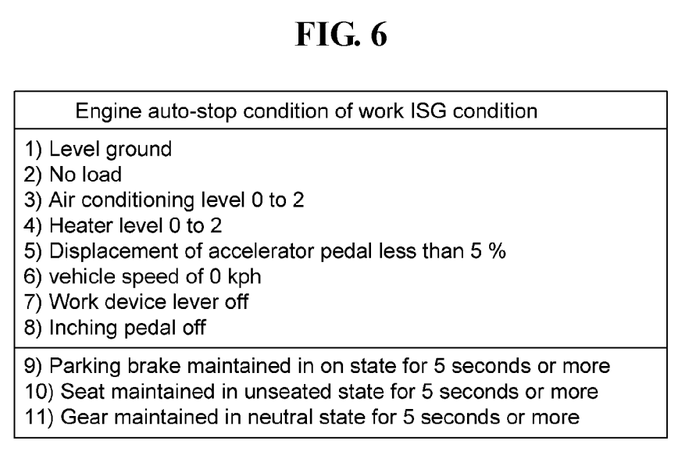

Subsequently, as illustrated in FIG. 6, under conditions that the construction machine is located on a level ground, the construction machine is in the no-load state, the air conditioner with a maximum level 3 operates at a level ranging from 0 to 2, the heater with a maximum level 3 operates at a level ranging from 0 to 2, the displacement of the accelerator pedal is less than 5%, the vehicle speed of the construction machine is 0 [km/h], the work device lever is in the off state (e.g., the work device lever is in a non-operation state), and the inching pedal is in the off state, the vehicle controller 100 determines that the engine auto-stop condition of the work ISG condition is satisfied, when the parking brake is maintained in the on state for 5 seconds or more, the seat 9 is maintained in the unseated state for 5 seconds or more, or the gear 180 is maintained in the neutral state for 5 seconds or more. That is, when all of the conditions 1) to 8) of FIG. 6 are satisfied and any one of the conditions 9) to 10) is satisfied, it is determined that the engine auto-stop condition is satisfied.

In such an embodiment, when an intensity of the air conditioner is level 0 to 2, it may mean that the air conditioner is not driven at a maximum level (for example, level 3), and when an intensity of the heater is level 0 to 2, it may mean that the heater is not driven at a maximum level (for example, level 3).

When all the conditions of FIGS. 5 and 6 are satisfied, the vehicle controller 100 may transmit an engine stop signal to the engine controller 124 to cause the engine controller 124 to stop the engine.

Figure 7:
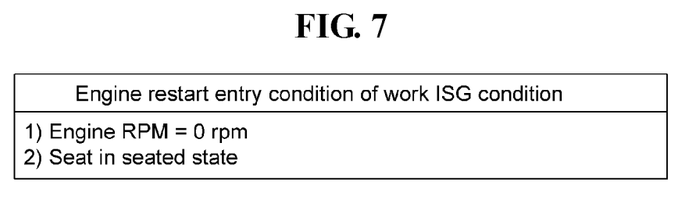

In an embodiment, after the engine is stopped, as illustrated in FIG. 7, when the engine revolution number is 0 and the seat 9 is maintained in the seated state, the vehicle controller 100 determines the engine restart entry condition of the work ISG condition is satisfied. That is, when all of the conditions 1) and 2) of FIG. 7 are satisfied, it is determined that the engine restart entry condition is satisfied.

Figure 8:
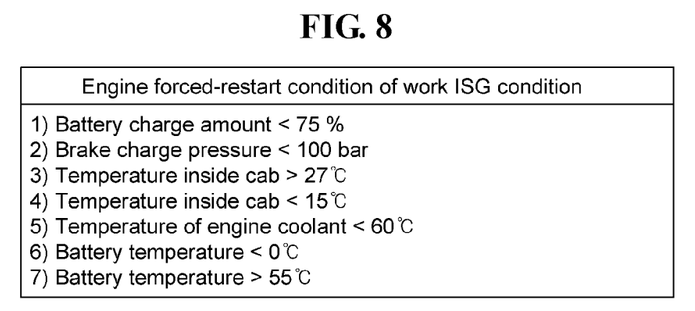

Next, as illustrated in FIG. 8, when the battery charge amount is less than 75%, the charge pressure of the brake (e.g., foot brake) is less than 100 bar, the temperature in the cab 8 is greater than 27 degrees Celsius, the temperature in the cab 8 is less than 15 degrees Celsius, the temperature of the engine coolant is less than 60 degrees Celsius, the battery temperature is less than 0 degrees Celsius, or the battery temperature is greater than 55 degrees Celsius, the vehicle controller 100 determines that the engine forced-restart condition of the work ISG condition is satisfied. That is, when any one of the conditions 1) to 7) of FIG. 8 is satisfied, it is determined that the engine forced-restart condition is satisfied. This engine forced-restart condition corresponds to a cancellation condition of automatic stopping of the engine. In other words, when any one of the conditions 1) to 7) of FIG. 8 is satisfied, the automatic stopping of the engine is forcibly cancelled, and the engine is operated.

Figure 9:
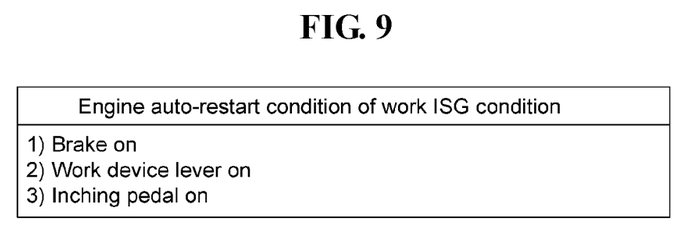

Subsequently, as illustrated in FIG. 9, when the brake (e.g., foot brake) is in the on state, the work device lever is in the on state (e.g., a state in which the work device lever is operated to move in an arbitrary direction), or the inching pedal is in the on state, the vehicle controller 100 determines that the engine auto-restart condition of the work ISG condition is satisfied. In other words, when any one of the conditions 1) to 3) of FIG. 9 is satisfied, it is determined that the engine auto-restart condition is satisfied.

As described above, after the engine is stopped by the work ISG condition, if the conditions of FIGS. 7 and 9 are satisfied and the conditions of FIG. 8 are not satisfied, the engine is restarted.

FIGS. 10 to 14 are tables showing the engine auto-stop entry condition, the engine auto-stop condition, the engine restart entry condition, the engine forced-restart condition, and the engine auto-restart condition included in the travel ISG condition.

Figure 10:
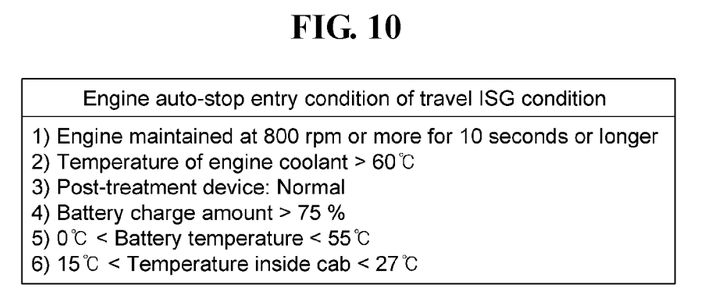
FIGS. 10 to 14 are tables showing an engine auto-stop entry condition, an engine auto-stop condition, an engine restart entry condition, an engine forced-restart condition, and an engine auto-restart condition included in a travel ISG condition.

As illustrated in FIG. 10, under conditions that it is determined that the construction machine is in the traveling state and that the ISG cut-off switch 102 is in the off state, the vehicle controller 100 determines that the engine auto-stop entry condition of the travel ISG condition is satisfied, when the engine is maintained at 800 rpm or more for 10 seconds or longer, the temperature of the engine coolant is greater than 60 degrees Celsius, the post-treatment device 170 is in the off state, the battery charge amount is greater than 75%, the battery temperature is greater than 0 degrees Celsius and less than 55 degrees Celsius, and the temperature in the cab 8 is greater than 15 degrees Celsius and less than 27 degrees Celsius. That is, when all the conditions 1) to 6) of FIG. 10 are satisfied, it is determined that the engine auto-stop entry condition is satisfied. The engine auto-stop entry condition of the travel ISG condition is substantially the same as the engine auto-stop entry condition of the work ISG condition described above.

Figure 11:
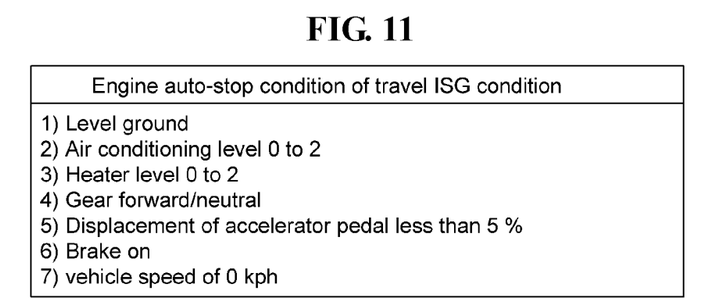

Subsequently, as illustrated in FIG. 11, when the construction machine is located on a level ground, the air conditioner with a maximum level 3 operates at a level ranging from 0 to 2, the heater with a maximum level 3 operates at a level ranging from 0 to 2, the gear 180 is positioned in either forward or neutral, the displacement of the accelerator pedal is less than 5%, the brake is in the on state, and the vehicle speed is 0, the vehicle controller 100 determines that the engine auto-stop condition of the travel ISG condition is satisfied. That is, when all of the conditions 1) to 7) of FIG. 11 are satisfied, it is determined that the engine auto-stop condition is satisfied.

In such an embodiment, when an intensity of the air conditioner is level 0 to 2, it may mean that the air conditioner is not driven at a maximum level (for example, level 3), and when an intensity of the heater is level 0 to 2, it may mean that the heater is not driven at a maximum level (for example, level 3).

When all of the above-described conditions of FIGS. 10 and 11 are satisfied, the vehicle controller 100 may transmit an engine stop signal to the engine controller 124 to cause the engine controller 124 to stop the engine.

Figure 12:
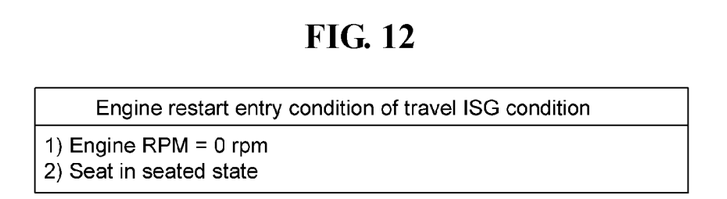

In an embodiment, after the engine is stopped, as illustrated in FIG. 12, when the engine revolution number is 0 and the seat is maintained in the seated state, the vehicle controller 100 determines that engine restart entry condition of the travel ISG condition is satisfied. That is, when all the conditions 1) and 2) of FIG. 12 are satisfied, it is determined that the engine restart entry condition is satisfied. The engine restart entry condition of the travel ISG condition is substantially the same as the engine restart entry condition of the work ISG condition described above.

Figure 13:
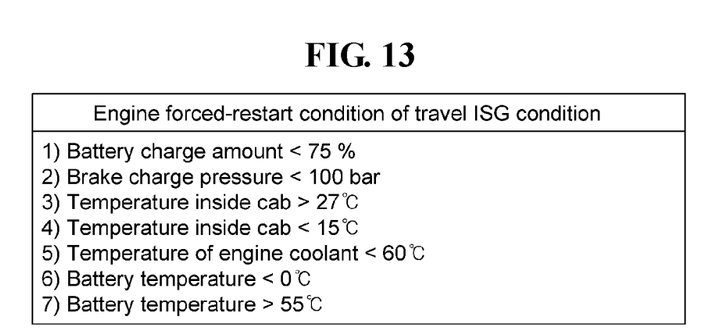

Next, as illustrated in FIG. 13, when the battery charge amount is less than 75%, the charge pressure of the brake (e.g., foot brake) is less than 100 bar, the temperature in the cab 8 is greater than 27 degrees Celsius, the temperature in the cab 8 is less than 15 degrees Celsius, the temperature of the engine coolant is less than 60 degrees Celsius, the battery temperature is less than 0 degrees Celsius, or the battery temperature is greater than 55 degrees Celsius, the vehicle controller 100 determines that the engine forced-restart condition of the travel ISG condition is satisfied. That is, when any one of the conditions 1) to 7) of FIG. 13 is satisfied, it is determined that the engine forced-restart condition is satisfied. This engine forced-restart condition corresponds to a cancellation condition of automatic stopping of the engine. In other words, when any one of the conditions 1) to 7) of FIG. 13 is satisfied, the automatic stopping of the engine is forcibly cancelled, and the engine is operated.

Figure 14:
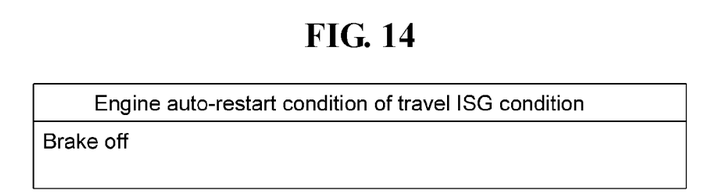

Subsequently, as illustrated in FIG. 14, when the brake (e.g., foot brake) is in the off state, the vehicle controller 100 determines that the engine auto-restart condition of the travel ISG condition is satisfied.

As described above, after the engine is stopped by the travel ISG condition, if the condition of FIGS. 12 and 14 are satisfied and the condition of FIG. 13 is not satisfied, the engine is restarted.

Figure 15:
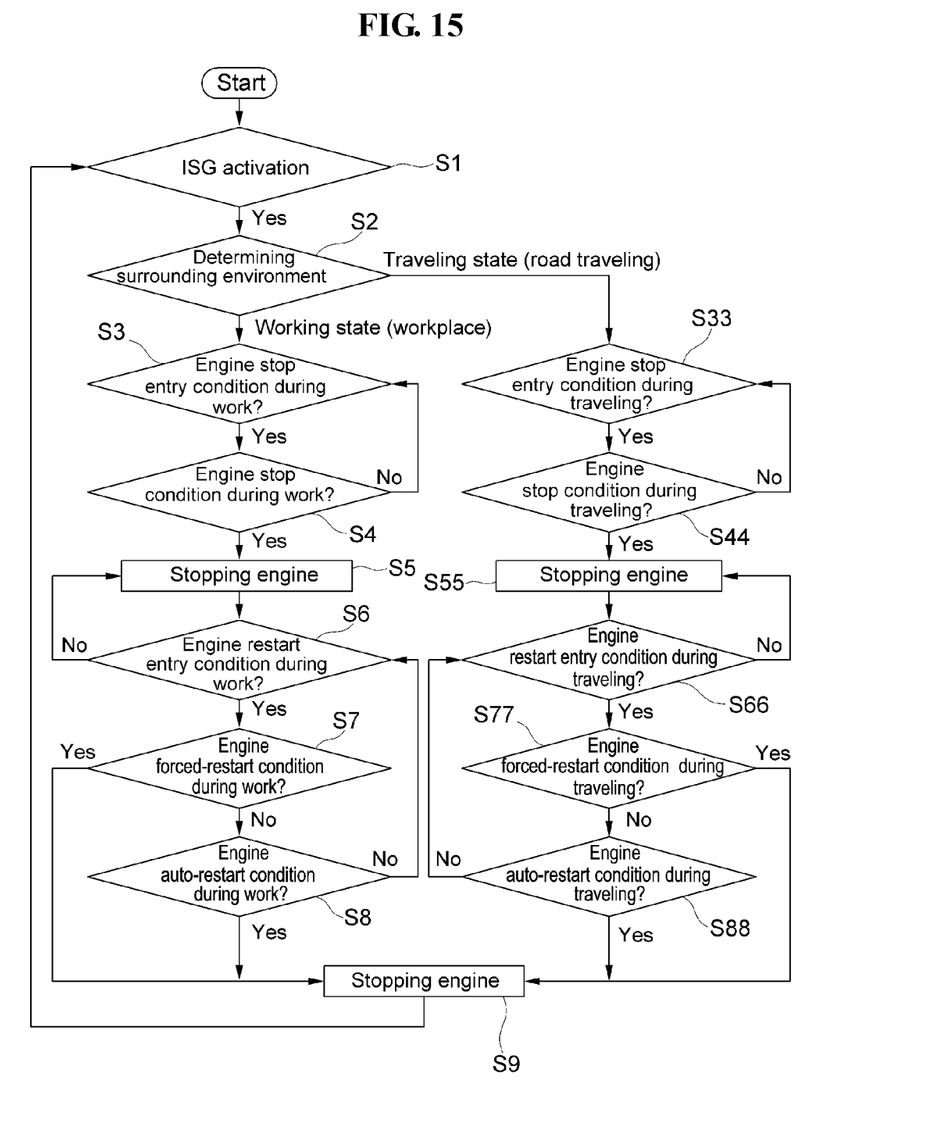
FIG. 15 is a flowchart illustrating an ISG control method for a construction machine according to an embodiment of the present disclosure.

FIG. 15 is a flowchart illustrating an ISG control method for a construction machine according to an embodiment of the present disclosure.

First, the ISG control method for a construction machine determines whether ISG is activated (51). For example, it is determined whether the ISG cut-off switch 102 is in the off state.

When the ISG cut-off switch 102 is in the off state, surrounding environment of the construction machine is determined (S2).

When it is determined that the construction machine is in the working state as a determination result on the surrounding environment, the engine is controlled based on the preset work ISG condition (S33, S44, S66, S77, S88).

On the other hand, when it is determined that the construction machine is in the traveling state, the engine is controlled based on the preset travel ISG condition (S3, S4, S6, S7, S8).

The work ISG condition includes the engine stop entry condition, the engine stop condition, the engine restart entry condition, the engine forced-restart condition, and the engine auto-restart condition described above.

The travel ISG condition includes the engine stop entry condition, the engine stop condition, the engine restart entry condition, the engine forced-restart condition, and the engine auto-restart condition described above.

When it is determined that the construction machine is in the working state, controlling of the engine based on the work ISG condition includes: determining whether the engine stop entry condition of the work ISG condition is satisfied (S3); determining whether the engine stop condition of the work ISG condition is satisfied when the engine stop entry condition of the work ISG condition is satisfied (S4); stopping the engine when the engine stop condition of the work ISG condition is satisfied (S5); determining whether the engine restart entry condition of the work ISG condition is satisfied (S6); determining whether the engine forced-restart condition of the work ISG condition is satisfied when the engine restart entry condition of the work ISG condition is satisfied (S7); determining whether the engine auto-restart condition of the work ISG condition is satisfied when the engine forced-restart condition of the work ISG condition is not satisfied (S8); and restarting the engine when the engine auto-restart condition of the work ISG condition is satisfied (S9).

When it is determined that the construction machine is in the traveling state, controlling of the engine based on the travel ISG condition includes: determining whether the engine stop entry condition of the travel ISG condition is satisfied (S33); determining whether the engine stop condition of the travel ISG condition is satisfied when the engine stop entry condition of the travel ISG condition is satisfied (S44); stopping the engine when the engine stop condition of the travel ISG condition is satisfied (S55); determining whether the engine restart entry condition of the travel ISG condition is satisfied (S66); determining whether the engine forced-restart condition of the travel ISG condition is satisfied when the engine restart entry condition of the travel ISG condition is satisfied (S77); determining whether the engine auto-restart condition of the travel ISG condition is satisfied when the engine forced-restart condition of the travel ISG condition is not satisfied (S88); and restarting the engine when the engine auto-restart condition of the travel ISG condition is satisfied (S9).

As set forth hereinabove, according to one or more embodiments of the present disclosure, ISG control is possible not only when a construction machine is in the traveling state but also when it is in the working state. Accordingly, it is possible to substantially minimize unnecessary fuel consumption of the construction machine even when the construction machine is working.

While the present disclosure has been illustrated and described with reference to the embodiments thereof, it will be apparent to those of ordinary skill in the art that various changes in form and detail may be made thereto without departing from the spirit and scope of the present disclosure.

What is claimed is:

1. An ISG (Idle Stop and Go) control system for a construction machine, comprising:
    a surrounding environment determinator configured to determine surrounding environment of the construction machine; and
    a vehicle controller configured to determine whether the construction machine is in a working state or a traveling state based on a determination result from the surrounding environment determinator,
        wherein the vehicle controller controls an engine based on a preset work ISG condition when it is determined that the construction machine is in the working state,
    wherein the vehicle controller controls the engine based on a preset travel ISG condition when it is determined that the construction machine is in the traveling state,
    wherein the surrounding environment determinator photographs the surrounding environment of the construction machine and transmits image information of the photographed surrounding environment to the vehicle controller, when the image information includes a lane around the construction machine, the vehicle controller determines that the construction machine is currently in the traveling state,
    wherein the vehicle controller determines that an engine auto-stop entry condition of the work ISG condition is satisfied under conditions that the construction machine is in the working state,
    an ISG cut-off switch of the construction machine is in an off state,
        the engine is maintained at 800 rpm or more for at least 10 seconds,
        a temperature of an engine coolant of the construction machine is greater than 60 degrees Celsius,
        a battery charge amount of the construction machine is greater than 75%,
    a battery temperature of the construction machinery is greater than 0 degrees Celsius and less than 55 degrees Celsius, and
    a temperature in a cab of the construction machine is greater than 15 degrees Celsius and less than 27 degrees Celsius.

2. The ISG control system for the construction machine of claim 1, wherein the vehicle controller determines that the construction machine is in the working state when the surrounding environment determinator determines that a location where the construction machine is located is an indoor space or a preset workplace.

3. The ISG control system for the construction machine of claim 1, wherein the vehicle controller determines that the construction machine is in the traveling state when the surrounding environment determinator determines that the lane exists around the construction, and when a vehicle speed of the construction machine exceeds a preset reference speed.

4. An ISG (Idle Stop and Go) control system for a construction machine, comprising:
    a surrounding environment determinator configured to determine surrounding environment of the construction machine; and
    a vehicle controller configured to determine whether the construction machine is in a working state or a traveling state based on a determination result from the surrounding environment determinator,
        wherein the vehicle controller controls an engine based on a preset work ISG condition when it is determined that the construction machine is in the working state,
    wherein the vehicle controller controls the engine based on a preset travel ISG condition when it is determined that the construction machine is in the traveling state, and
    wherein the vehicle controller determines that an engine auto-stop entry condition of the work ISG condition is satisfied under conditions that the construction machine is in the working state,
    an ISG cut-off switch of the construction machine is in an off state,
        the engine is maintained at 800 rpm or more for at least 10 seconds,
        a temperature of an engine coolant of the construction machine is greater than 60 degrees Celsius,
        a battery charge amount of the construction machine is greater than 75%,
    a battery temperature of the construction machinery is greater than 0 degrees Celsius and less than 55 degrees Celsius, and
    a temperature in a cab of the construction machine is greater than 15 degrees Celsius and less than 27 degrees Celsius.

5. The ISG control system for the construction machine of claim 4, wherein the vehicle controller determines that an engine auto-stop condition of the work ISG condition is satisfied under conditions that the construction machine is located on a level ground,
    the construction machine is in a no-load state,
    an air conditioner of the construction machine operates at a level less than a maximum level,
        a heater of the construction machine operates at a level less than a maximum level,
        a displacement of an accelerator pedal of the construction machine is less than 5%,
        a speed of the construction machine is 0,
        a work device lever of the construction machine is in an off state, and
        an inching pedal of the construction machine is in an off state,
    a parking brake of the construction machine is maintained in an on state for 5 seconds or more,
    a seat of the construction machine is maintained in an unseated state for 5 seconds or more, or
    a gear of the construction machine is maintained in a neutral state for 5 seconds or more.

6. The ISG control system for the construction machine of claim 5, wherein the vehicle controller determines that an engine restart entry condition of the work ISG condition is satisfied,
        when a revolution number of the engine is 0 after the engine auto-stop condition of the work ISG condition is satisfied and the engine is stopped, and
        the seat is maintained in a seated state.

7. The ISG control system for a construction machine of claim 6, wherein the vehicle controller determines that an engine forced-restart condition of the work ISG condition is satisfied under conditions that the battery charge amount is less than 75%,
        a charge pressure of a brake of the construction machine is less than 100 bar, the temperature in the cab is greater than 27 degrees Celsius,
the temperature in the cab is less than 15 degrees Celsius,
the temperature of the engine coolant is less than 60 degrees Celsius,
the battery temperature is less than 0 degrees Celsius, or
the battery temperature is greater than 55 degrees Celsius.

8. The ISG control system for the construction machine of claim 7, wherein the vehicle controller determines that an engine auto-restart condition of the work ISG condition is satisfied under conditions that the brake is in an on state,
the work device lever of the construction machine is operated, or
the inching pedal is in an on state.

9. The ISG control system for the construction machine of claim 1, wherein the vehicle controller determines that an engine auto-stop entry condition of the travel ISG condition is satisfied under conditions that the construction machine is in the traveling state,
an ISG cut-off switch of the construction machine is in an off state,
the engine is maintained at 800 rpm or more for 10 seconds or longer,
a temperature of an engine coolant of the construction machine is greater than 60 degrees Celsius,
a battery charge amount of the construction machine is greater than 75%,
a battery temperature of the construction machinery is greater than 0 degrees Celsius and less than 55 degrees Celsius, and
a temperature in a cab of the construction machine is greater than 15 degrees Celsius and less than 27 degrees Celsius.

10. The ISG control system for the construction machine of claim 9, wherein the vehicle controller determines that an engine auto-stop condition of the travel ISG condition is satisfied under conditions that the construction machine is located on a level ground,
the construction machine is in a no-load state, an air conditioner of the construction machine operates at a level less than a maximum level,
a heater of the construction machine operates at a level less than a maximum level,
a gear of the construction machine is positioned in either forward or neutral,
a displacement of an accelerator pedal of the construction machine is less than 5%,
a brake of the construction machine is in an on state, and
a vehicle speed of the construction machine is 0.

11. The ISG control system for the construction machine of claim 10, wherein after the engine auto-stop condition is satisfied and the engine is stopped,
when a revolution number of the engine is 0, and
the seat is maintained in a seated state,
the vehicle controller determines that an engine restart entry condition of the travel ISG condition is satisfied.

12. The ISG control system for a construction machine of claim 11, wherein the vehicle controller determines that an engine forced-restart condition of the travel ISG condition is satisfied under conditions that the battery charge amount is less than 75%,
a charge pressure of the brake of the construction machine is less than 100 bar,
the temperature in the cab is greater than 27 degrees Celsius,
the temperature in the cab is less than 15 degrees Celsius,
the temperature of the engine coolant is less than 60 degrees Celsius,
the battery temperature is less than 0 degrees Celsius, or
the battery temperature is greater than 55 degrees Celsius.

13. The ISG control system for the construction machine of claim 12, wherein the vehicle controller determines that an engine auto-restart condition of the travel ISG condition is satisfied when the brake is in an off state.

14. A method of controlling ISG of a construction machine, the method comprising:
determining surrounding environment of the construction machine; and
determining whether the construction machine is in a working state or a traveling state based on a determination result of the surrounding environment,
wherein the vehicle controller controls an engine based on a preset work ISG condition when it is determined that the construction machine is in the working state, and
wherein the vehicle controller controls the engine based on a preset travel ISG condition when it is determined that the construction machine is in the traveling state,
wherein the determining surrounding environment of the construction machine comprises photographing the surrounding environment of the construction machine and transmitting image information of the photographed surrounding environment to the vehicle controller,
when the image information includes a lane around the construction machine, the vehicle controller determines that the construction machine is currently in the traveling state
wherein the vehicle controller determines that an engine auto-stop entry condition of the work ISG condition is satisfied under conditions that the construction machine is in the working state,
an ISG cut-off switch of the construction machine is in an off state,
the engine is maintained at 800 rpm or more for at least 10 seconds,
a temperature of an engine coolant of the construction machine is greater than 60 degrees Celsius,
a battery charge amount of the construction machine is greater than 75%,
a battery temperature of the construction machinery is greater than 0 degrees Celsius and less than 55 degrees Celsius, and
a temperature in a cab of the construction machine is greater than 15 degrees Celsius and less than 27 degrees Celsius.

15. The method of controlling ISG of the construction machine of claim 14, wherein the work ISG condition comprises an engine stop entry condition, an engine stop condition, an engine restart entry condition, an engine forced-restart condition, and an engine auto-restart condition, and
the travel ISG condition comprises an engine stop entry condition, an engine stop condition, an engine restart entry condition, an engine forced-restart condition, and an engine auto-restart condition.

16. The method of controlling ISG of the construction machine of claim 15, wherein the step of controlling of the engine based on the work ISG condition when it is determined that the construction machine is in the working state comprises:
determining whether the engine stop entry condition of the work ISG condition is satisfied;
determining whether the engine stop condition of the work ISG condition is satisfied when the engine stop entry condition of the work ISG condition is satisfied;
stopping the engine when the engine stop condition of the work ISG condition is satisfied;

determining whether the engine restart entry condition of the work ISG condition is satisfied;

determining whether the engine forced-restart condition of the work ISG condition is satisfied when the engine restart entry condition of the work ISG condition is satisfied;

determining whether the engine auto-restart condition of the work ISG condition is satisfied when the engine forced-restart condition of the work ISG condition is not satisfied; and restarting the engine when the engine auto-restart condition of the work ISG condition is satisfied.

17. The method of controlling ISG of the construction machine of claim 15, wherein the step of controlling of the engine based on the travel ISG condition when it is determined that the construction machine is in the traveling state comprises:

determining whether the engine stop entry condition of the travel ISG condition is satisfied;

determining whether the engine stop condition of the travel ISG condition is satisfied when the engine stop entry condition of the travel ISG condition is satisfied;

stopping the engine when the engine stop condition of the travel ISG condition is satisfied;

determining whether the engine restart entry condition of the travel ISG condition is satisfied;

determining whether the engine forced-restart condition of the travel ISG condition is satisfied when the engine restart entry condition of the travel ISG condition is satisfied;

determining whether the engine auto-restart condition of the travel ISG condition is satisfied when the engine forced-restart condition of the travel ISG condition is not satisfied; and restarting the engine when the engine auto-restart condition of the travel ISG condition is satisfied.

\* \* \* \* \*